United States Patent [19]
Patterson et al.

[11] Patent Number: 5,749,754
[45] Date of Patent: May 12, 1998

[54] RADIOTELEPHONE HAVING A COMBINATION FASTENER AND ELECTRICAL CONNECTOR

[75] Inventors: Gregory S. Patterson, Morrisville; Darrell G. Epperson, Wake Forest, both of N.C.

[73] Assignee: Ericsson, Inc., RTP, N.C.

[21] Appl. No.: 684,391

[22] Filed: Jul. 19, 1996

[51] Int. Cl.⁶ .................................................. H01R 13/24
[52] U.S. Cl. ........................................ 439/824; 439/76.1
[58] Field of Search ............................ 439/700, 824, 439/76.1

[56] References Cited

U.S. PATENT DOCUMENTS

| | | |
|---|---|---|
| 483,974 | 10/1892 | Allam . |
| 1,339,694 | 5/1920 | Douglas . |
| 2,337,457 | 12/1943 | Dzus . |
| 2,773,964 | 12/1956 | Majkrzak . |
| 3,378,810 | 4/1968 | Dorrell ................................. 439/700 |
| 3,416,125 | 12/1968 | Theve ................................. 439/700 |
| 3,456,234 | 7/1969 | Lyman, Jr. . |
| 3,816,820 | 6/1974 | Stanaitis ............................. 339/263 |
| 4,145,107 | 3/1979 | De Haitre .......................... 339/263 |
| 4,397,519 | 8/1983 | Cooney ............................. 439/824 |
| 4,550,970 | 11/1985 | Ogino ................................. 339/97 |
| 4,734,061 | 3/1988 | Randall, Jr. et al. ............... 439/709 |
| 5,067,906 | 11/1991 | Woodgate .......................... 439/700 |
| 5,069,636 | 12/1991 | Shimirak et al. .................. 439/412 |

*Primary Examiner*—Gary F. Paumen

[57] ABSTRACT

A radiotelephone includes front and back housings, a printed circuit board disposed between the housings, and a battery having a pair of terminals secured to the back housing. A pair of fasteners secure the front and back housings together while sandwiching the printed circuit board therebetween and at the same time, provide an electrical connection between the battery terminals and conductive strips formed on the printed circuit board.

29 Claims, 5 Drawing Sheets

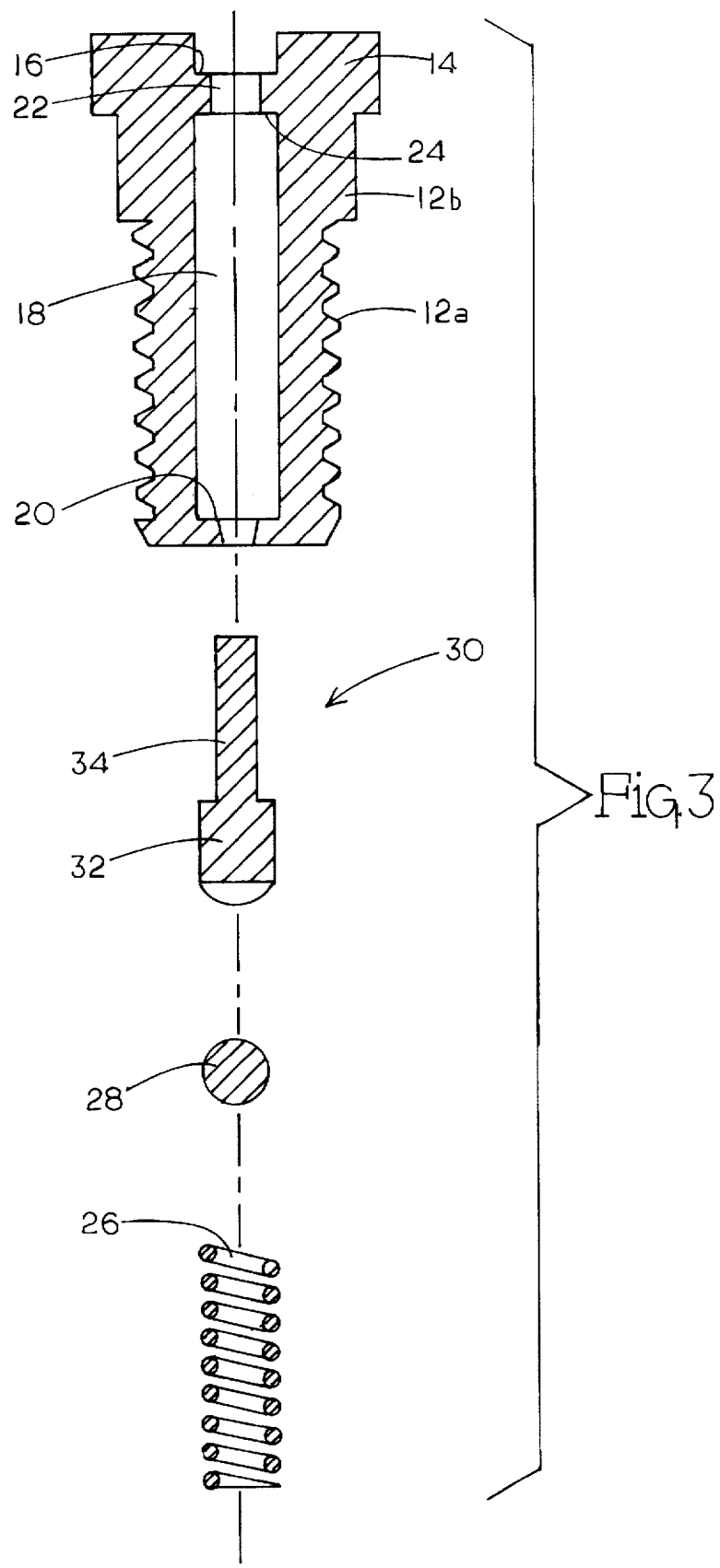

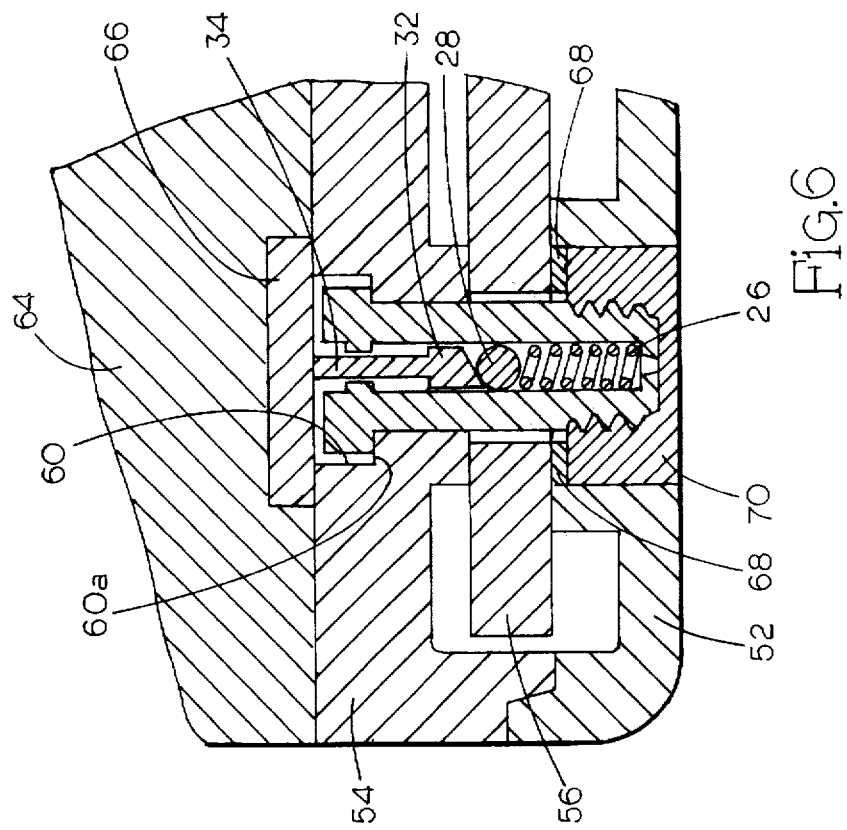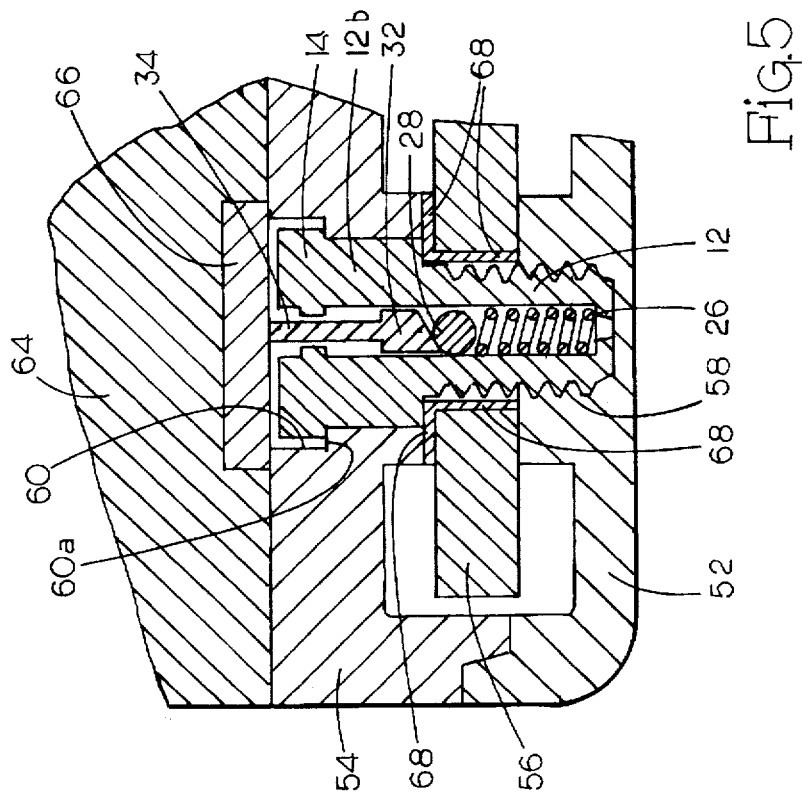

RADIOTELEPHONE HAVING A COMBINATION FASTENER AND ELECTRICAL CONNECTOR

FIELD OF THE INVENTION

The present invention relates to radiotelephones and more particularly to a combination fastener and electrical connector used therein to fasten components of the radiotelephone together while acting as a conductor for transferring current from a battery to a printed circuit board.

BACKGROUND OF THE INVENTION

The handheld cellular telephone market has made great strides toward smaller and lighter handsets. Once prevalent bulky shoulder-strapped portable units have been superseded by phones small enough to fit in the palm of a hand. As a result of this push toward miniaturization, a great demand has been put on the designers of the phone's componentry and printed circuit board to maximize efficient use of available space. A common approach used by designers is to combine functional and structural features of components to conserve space on printed circuit boards. This consolidation procedure reduces the number of components necessary for the specified purpose and has the added benefit of reducing the per unit cost of the phone.

In the construction of radiotelephones, "pogo" pin devices have been used to connect battery terminals to a printed circuit board. A typical pogo pin device consists of an electrical connector on the printed circuit board which is biased by a spring against the terminal of the battery to be electrically connected therewith. Pogo pins thus have the advantage of providing a flexible and continuous electrical connection.

Another method of connecting battery terminals to a printed circuit board in radiotelephone construction is to use gold-plated screws as the terminal connections on the printed circuit board. The use of screws has the advantage of being able to secure components within the assembly in addition to functioning as an electrical connector. However, in order to assure a flexible and continuous electrical connection between the battery terminals and the printed circuit board, the terminals of the battery must be provided with pliable contacts. This method results in the addition of components to the battery with corresponding additional cost.

Thus, there is a need in radiotelephones for an efficient and space-saving connector that will mechanically connect components together while at the same time serve as an electrical conductor for conducting current between selected points.

SUMMARY AND OBJECTS OF THE INVENTION

The present invention entails a radiotelephone having first and second housing components that encase a printed circuit board having first and second conductive strips formed thereon. In addition, the radiotelephone includes first and second battery terminals connected to a battery typically secured to one of the housing components. A pair of combination fastener and electrical connectors secure the first and second housing components about the printed circuit board while at the same time providing an electrical connection between the first and second conductive strip formed on the printed circuit board and the first and second terminals connected to the battery.

Each combination fastener and electrical connector includes a fastener having external threads. A cavity is formed in the fastener and an electrical conductor is movably contained within the cavity and movable from a retracted position within the cavity to an extended position. In the extended position, the movable conductor engages a respective terminal connected to the battery of the radiotelephone. Consequently, the combination fastener and electrical connector secures the first and second housings together and at the same time provides a pathway for electrical current to flow between the battery terminal and a conductive strip on the printed circuit board.

BRIEF DESCRIPTION OF THE DRAWINGS

FIG. 3 is an exploded transverse sectional view of the combination fastener and electrical connector of the present invention.

FIG. 5 is an enlarged sectional view illustrating the connection made between the combination fastener and conductor and the printed circuit board of the radiotelephone.

FIG. 6 is a fragmentary sectional view illustrating an alternative method of utilizing the combination fastener and electrical connector in a radiotelephone.

DETAILED DESCRIPTION OF THE INVENTION

Figure 2:
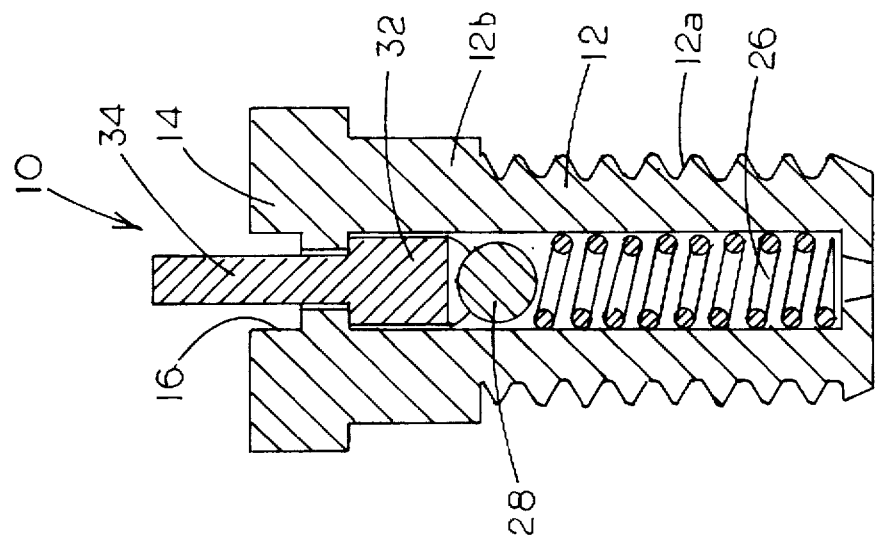
FIG. 2 is a transverse sectional view of an assembled combination fastener and electrical connector.
Figure 1:
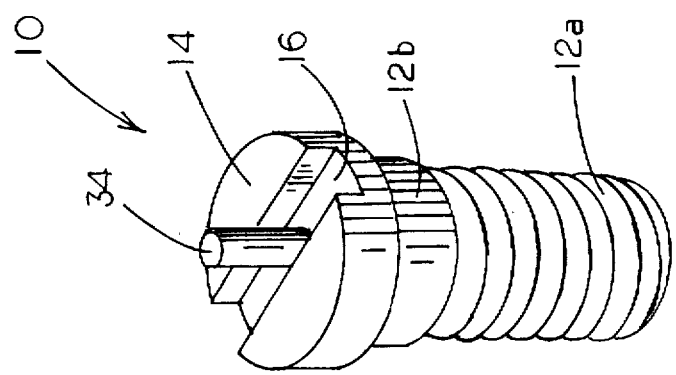
FIG. 1 is a perspective view of the combination fastener and electrical connector of the present invention.

With further reference to the drawings, particularly FIGS. 1, 2 and 3, the combination fastener and electrical connector is shown therein and indicated generally by the numeral 10. The combination fastener and electrical connector 10 includes a shaft 12 having an exterior threaded portion 12a and an upper shoulder 12b. Formed about the upper portion of the shaft 12 is a head 14 having a diametric slot 16 formed therein. Other types of heads could be used.

A cavity 18 is formed in the shaft 12 and as seen in the drawings, extends from a lower seat 20 to an outer opening 22. Lower seat 20 is closed after certain components are assembled into the cavity 18. Thus, cavity 18 is closed at the bottom but open at the top. Formed about a top portion of the cavity 18 is an upper stop 24 that is formed by an inner step in the side wall of the cavity.

An electrical connector, indicated generally by the numeral 30, is disposed within cavity 18 and is movable between an inner retracted position and an outer extended position. As seen in FIG. 2, the electrical connector 30 is supported over an engaging ball 28 that rests atop a coil spring 26 that is supported by the lower seat 20 formed in the cavity 18.

Viewing the electrical connector 30 in more detail, it is seen that the same includes a lower retaining section 32 and an upper contact pin 34. In the fully-retracted position, the upper contact pin 34 is depressed downwardly to the bottom of the diametric slot 16 in the head 14. In the outer extended position, the upper portion of the retaining section 32 engages the upper stop 24 thereby limiting the outer movement of the contact pin 34.

In FIGS. 1 and 3, contact pin 34 is disposed in its outer extended position. Note that contact pin 34 extends upwardly through the diametric slot 16 and through the outer opening 22 formed about the upper portion of cavity 18. As seen in the drawings, the lower portion of retaining section 32 is angled and this angled lower portion rests on the ball 28.

In addition, contact pin 34 is sized such that it can move up and down within the cavity 18 but yet serve as a conductor with respect to the shaft 12. That is, electrical current conducted through the contact pin 34 is likewise conducted therefrom into and through the shaft 12, including the head 14 thereof.

Figure 4:
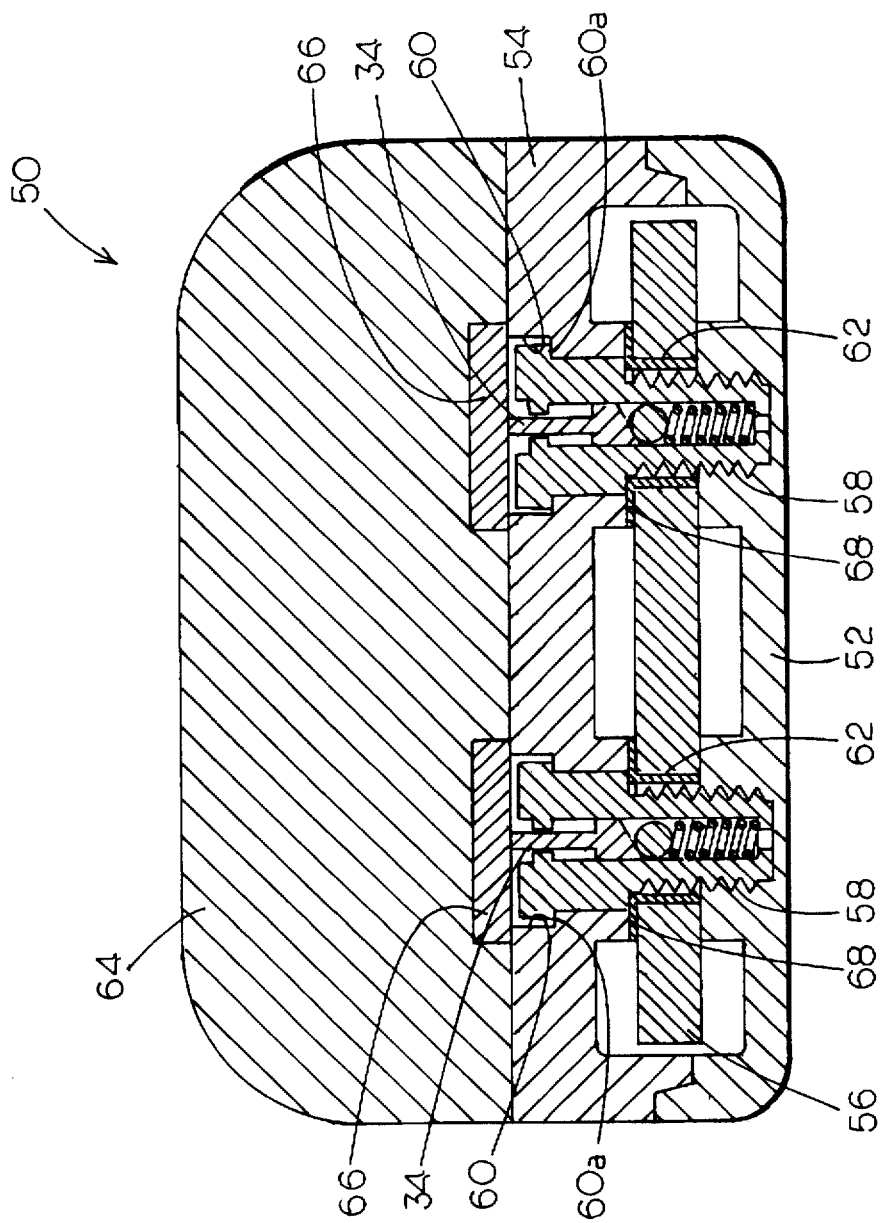
FIG. 4 is a cross-sectional view of the radiotelephone illustrating how the combination fastener and electrical connector connects various components together while making an electrical connection between a battery and printed circuit board associated with the radiotelephone.
Figure 7:
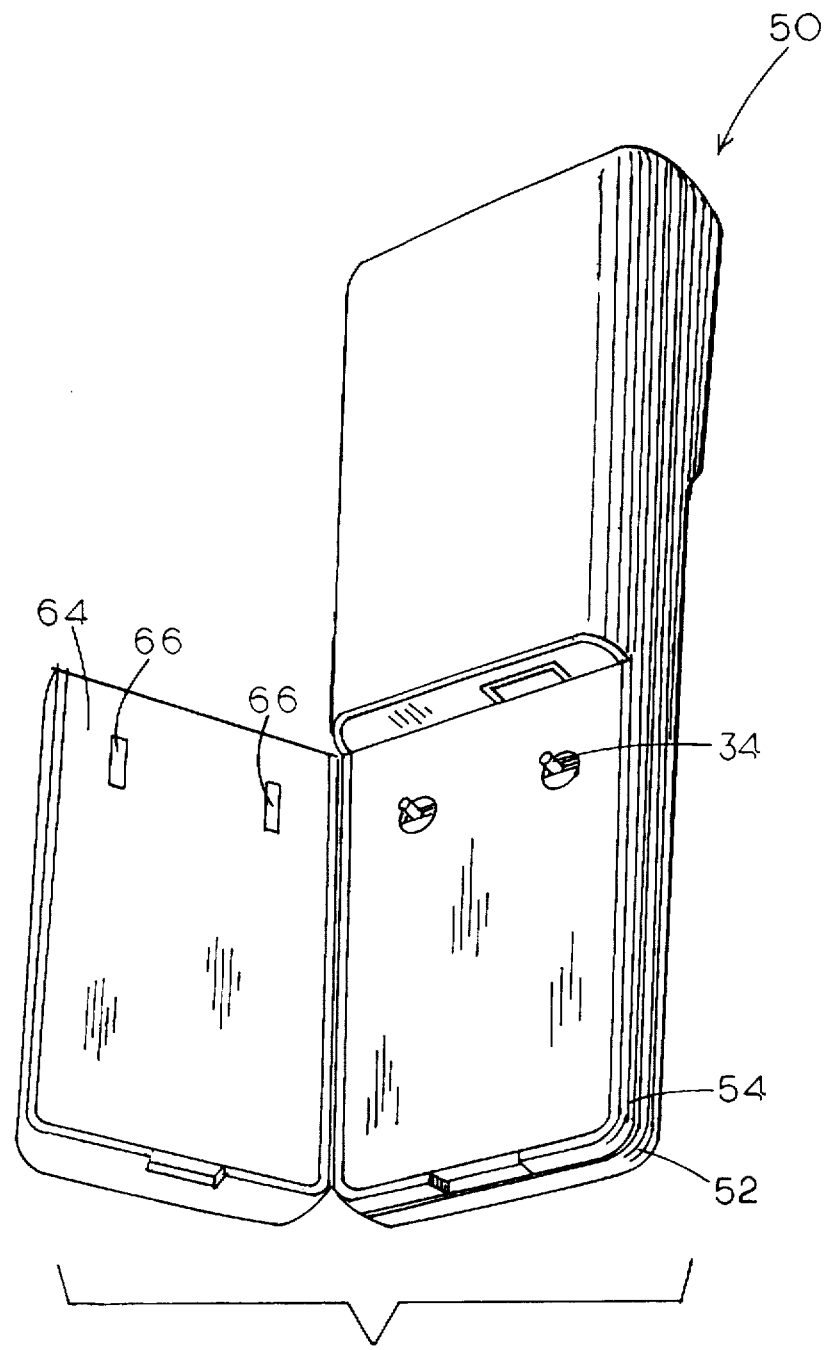
FIG. 7 is a perspective view of the radiotelephone showing the back housing and a battery detached therefrom.

Now, turning to FIGS. 4, 5 and 7, it is seen that the combination fastener and electrical connector 10 is shown embodied within a radiotelephone indicated generally by the numeral 50. In particular, a pair of the combination fastener and electrical connectors 10 are utilized within the radiotelephone to connect at least two components together while at the same time serving as an electrical connector between two spaced apart conductive strips or terminals. In some applications, only one combination fastener and connector may be needed.

With reference to FIGS. 4 and 7, the radiotelephone 50 includes a housing structure that in the case of the present design includes a front housing 52 and a back mating housing 54. A printed circuit board 56 is sandwiched and held between front housing 52 and back housing 54. In the front housing 52, there is provided a pair of threaded bores 58. In the back housing 54, there is provided a pair of throughbores 60. Each throughbore includes an upper or stepped ledge 60a. Likewise, printed circuit board 56 includes a pair of laterally spaced throughbores 62. As shown in FIG. 4, when the radiotelephone 50 is assembled, the threaded bores 58, throughbores 60 and 62 of the printed circuit board are all aligned. Details of the radiotelephone 50 are not disclosed herein because such is not per se material to the present invention and further, cellular radiotelephones are widely available and well-known in the art. By way of an example, radiotelephone 50 may be similar to any one of a number of radio telephones manufactured by Ericsson, Inc., of Research Triangle Park, N.C. such as the Ericsson AH-320.

As is appreciated by those skilled in the art, radiotelephones are typically provided with a detachable battery 64. Battery 64 is designed to be detachably connected to the back housing 54 and is provided with a pair of terminals 66 that are spaced to align with the throughbores 60 formed in the back housing 54 of the radiotelephone.

Formed adjacent each bore 62 of the printed circuit board 56 is a conductive trace 68. It is appreciated that one conductive trace or strip would be of a positive polarity while the other trace or conductive strip would be of a negative polarity. In any event, the respective conductive traces or strips 68 would be of opposite polarity to match the polarity of the battery terminals 66.

The conductive traces 68 are formed on the upper surface of the printed circuit board 56 directly adjacent the openings or bores 62 formed therein. In the embodiment illustrated in FIGS. 4 and 5, the conductive strips 68 are also formed on the inside wall of the bores 62. Thus, it is seen that the upper shoulder 12b of the shaft 12 is brought into electrical contact with a respective conductive trace 68 formed on the top surface (the surface facing the back housing 54). In addition, the exterior threads 12a of the shaft 12 are particularly sized such that they can engage and make electrical contact with the portion of the conductive traces or strips 68 that line the bores 62 formed in the printed circuit board 56. Consequently, the present design provides for electrical contact with the conductive traces or strips 68 by both the upper shoulder 12b and the exterior threads 12a of each shaft 12. However, it will be appreciated by those skilled in the art that various trace configurations in and around the bores 62 may be provided. Likewise, the combination fastener and electrical connector 10 may assume various designs in order to be compatible with such trace configurations.

FIG. 4 shows a cross-sectional view of the radiotelephone 50 with the battery 64 attached and with the combination fastener and electrical connector 10 establishing electrical contact between the battery terminal 66 and the conductive traces or strips 68. It is seen in FIG. 4 that the front and back housings 52 and 54 are held together by the respective shafts 12 being threaded into the threaded bores 58 of the front housing and the heads 14 engaging the stepped ledge 60a of the throughbores 60 that form openings within the back housing 54. In this condition, the battery terminal 66 engage the contact pins 34 of the electrical connector 30 and cause the electrical connector 30 to be depressed downwardly into the cavity 18 to where the electrical connector 30 assumes a semi-retracted position.

An alternative design is shown in FIG. 6 for securing the printed circuit board 56 between the front and back housings 52 and 54. In this design, a threaded metal insert 70 is pressed into a bore formed in the front housing 52. The respective conductive traces or strips 68 are formed on the side of the printed circuit board 56 facing the front housing 52. As illustrated in FIG. 6, the combination fastener and electrical connector 10 couples the front and back housing 52 and 54 together while at the same time sandwiching the printed circuit board 56 therebetween and pulling the metal insert 70 into electrical contact with the conductive trace 68 formed on the printed circuit board. Note that the upper shoulder 12b that is shown in the embodiment illustrated in FIGS. 4 and 5 is no longer present as there is no need for such in this alternative design. Thus, it is appreciated that an electrical connection is made between the contact pin 34 of the electrical connector and the trace 68 through the fastener and electrical connector 10 and the metal insert 70.

Thus, it is appreciated that the combination fastener and electrical connectors 10 serve the dual function of first securing at least two components together by mechanically coupling the same and secondly providing an electrical connection between the battery terminals 66 and the conductive traces or strips 68 formed on the printed circuit board 56. Thus, by combining these two functions together in a single structure, space within the radiotelephone 50 is conserved.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A combination fastener and electrical connector, comprising:

a) a fastener having external threads for securing two components together;

b) a cavity formed in the fastener and including an outer opening;

c) a movable electrical connector movably contained within the cavity and wherein the electrical connector and the fastener form a unit conductor;

d) a spring disposed within the cavity for biasing the electrical connector outwardly from the cavity so as to expose the electrical connector exteriorly of the fastener; and e) wherein the electrical connector may be pressed inwardly into the cavity against the spring.

2. The combination fastener and electrical connector of claim 1 wherein there is provided a ball interposed within the cavity between the spring and the electrical connector.

3. The combination fastener and electrical connector of claim 1 wherein and the electrical connector includes a shoulder and the cavity has formed therein a stop that engages the shoulder and limits the outer movement of the electrical connector being biased by the spring.

4. The combination fastener and electrical connector of claim 3 wherein the cavity includes an inwardly stepped wall that forms the stop that engages the shoulder of the electrical connector.

5. A combination fastener and electrical connector, comprising:

a) a fastener including a shaft, a head and exterior threads formed on the shaft;

b) a cavity formed internally within the fastener and extending through both the shaft and the head, the cavity including a lower seat and an outer opening formed in the head of the fastener;

c) a spring supported above the seat and disposed within the cavity of the fastener;

d) a ball disposed in the cavity and supported by the spring; and e) an electrical connector movably contained within the cavity of the fastener and supported above the spring and the ball, the electrical connector normally assuming a biased extended position where the electrical connector extends outwardly through the outer opening of the cavity outwardly of the fastener, for electrical contact outside of the fastener, and wherein the electrical connector can be depressed downwardly into the cavity against the biasing action of the spring.

6. The combination fastener and electrical connector of claim 5 wherein the cavity includes a stop for limiting the outward movement of the electrical connector.

7. The combination fastener and electrical connector of claim 6 wherein the electrical connector includes a shoulder that engages the stop formed in the cavity and which consequently limits the outward movement of the electrical connector.

8. The combination fastener and electrical connector of claim 5 wherein the head of the fastener includes a diametric slot and wherein the outer opening of the cavity opens to the diametric slot.

9. The combination fastener and electrical connector of claim 8 wherein the electrical connector extends outwardly through the diametric slot when the electrical connector assumes the biased extended position.

10. A combination fastener and electrical connector comprising:

a) a fastener for securing two components together and including a head portion, a shaft portion, and exterior threads formed on the shaft portion;

b) a cavity formed internally within the fastener and extending between the shaft and head portions, the cavity including a lower seat and an outer opening formed about the head portion of the fastener;

c) a movable electrical connector movably contained within the cavity and movable back and forth therein between an inner position and an outer extended position where at least a portion of the electrical connector projects through the outer opening and from the cavity and is exposed exteriorly of the fastener;

d) a stop formed in the cavity for engaging the electrical connector when the same assumes the extended position and limiting the electrical connector from further outward movement; and e) a spring interposed in the cavity between the seat and the electrical connector for biasing the electrical connector towards the extended position and wherein the electrical connector may be moved back and forth within the cavity between the inner position and the outer extended position.

11. The combination fastener and electrical connector of claim 10 wherein the electrical connector includes a shoulder that engages the stop and establishes the outer extended position of the electrical connector.

12. The combination fastener and electrical connector of claim 11 wherein the cavity includes a wall and wherein the stop is formed by an inward step in the wall.

13. The combination fastener and electrical connector of claim 10 further including a ball interposed between the spring and the electrical connector.

14. The combination fastener and electrical connector of claim 13 wherein the electrical connector includes a shoulder and a contact pin extending outwardly from the shoulder and wherein the electrical connector includes an angled engaging surface for engaging the ball interposed between the spring and the electrical connector.

15. The combination fastener and electrical connector of claim 10 wherein the head portion of the fastener includes a diametric slot and wherein the outer opening of the cavity is open to the diametric slot.

16. A radiotelephone comprising:

a) first and second components;

b) a printed circuit board having a first conductive surface formed thereon;

c) a second conductive surface spaced from the first conductive surface; and d) a combination fastener and electrical connector for stationarily securing the first and second components and at the same time forming an electrical connection between the first and second conductive surface.

17. The radiotelephone of claim 16 wherein the combination fastener and electrical connector includes a movable conductor movable between first and second positions.

18. The radiotelephone of claim 17 wherein the combination fastener and electrical connector includes a cavity and wherein the movable electrical conductor is movable therein between the first and second positions.

19. The radiotelephone of claim 18 wherein there is provided a spring disposed within the cavity for biasing the conductor towards a position exteriorly of the cavity.

20. The radiotelephone of claim 19 wherein the combination fastener and electrical connector includes external threads and wherein at least one of the components is threaded to receive the external threads of the combination fastener and electrical connector; and wherein the combination fastener and electrical connector extends through an opening in the printed circuit board and secures the printed circuit board between the two components while making an electrical connection between the first and second conductive strips.

21. The radiotelephone of claim 18 wherein a threaded metal insert is disposed in at least one of the components and wherein the combination fastener and electrical connector is threaded into the metal insert.

22. The radiotelephone of claim 21 wherein the combination fastener and electrical connector is effective to urge the metal insert into electrical contact with one of the conductive surfaces.

23. A radiotelephone comprising:

a) first and second housing components;

b) a printed circuit board disposed adjacent at least one of the housing components and including first and second conductive strips formed thereon;

c) first and second battery terminals connected to a battery;

d) a pair of combination fastener and electrical connectors for engaging and securing the first and second housing components relative to each other and for electrically connecting the first and second conductive strips with the first and second terminals;

e) each combination fastener and electrical connector including:

1) a fastener having external threads thereon and extending at least partially through openings formed in the first and second housing components, and wherein the fastener contacts one of the conductive strips formed on the printed circuit board;

2) a cavity formed in the fastener and including an opening; and 3) a movable conductor disposed within the cavity and movable between a retracted position and an extended position where the conductor extends through the opening formed in the cavity and engages one of the terminals connected to the battery.

24. The radiotelephone of claim 23 including a spring disposed within the cavity of each fastener for biasing the conductor outwardly from the cavity and to the extended position.

25. The radiotelephone of claim 24 wherein there is provided a ball interposed within the cavity of each fastener between the spring and the movable conductor.

26. The radiotelephone of claim 23 wherein each fastener includes an exterior shoulder for engaging one of the conductive strips formed on the printed circuit board.

27. The radiotelephone of claim 23 wherein at least one of the housing components includes a pair of threaded openings for receiving the respective fasteners.

28. The radiotelephone of claim 23 wherein the printed circuit board is sandwiched between the first and second housing components and wherein the fasteners extend through the housing components and the printed circuit board and effectively secures the two housing components together while securing the printed circuit board therebetween.

29. The radiotelephone of claim 28 wherein one of the housing components forms the back of the radiotelephone and wherein a battery is attached to the back and includes the first and second terminals, and wherein the back includes a pair of openings adjacent the terminals that allows the conductors to project therethrough for engagement with the terminals of the battery.

* * * * *